Nov. 11, 1924.                                                                 1,515,538
                        O. B. BACHMAN
                       DEMOUNTABLE RIM
                    Filed June 28 1921       2 Sheets-Sheet 1

WITNESSES
H. Harwood
Robert I. Hulsizer

INVENTOR
O. B. BACHMAN.
BY
ATTORNEYS

Nov. 11, 1924.
O. B. BACHMAN
1,515,538
DEMOUNTABLE RIM
Filed June 28, 1921  2 Sheets-Sheet 2
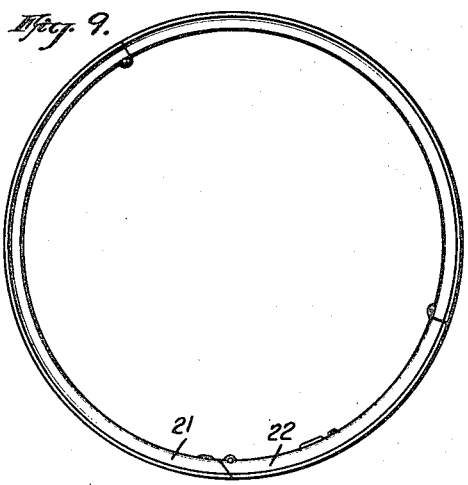
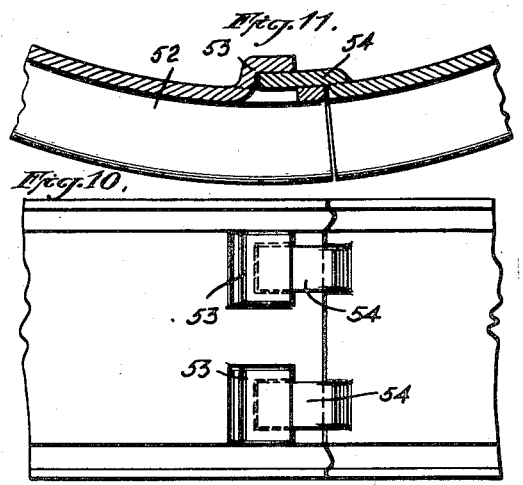
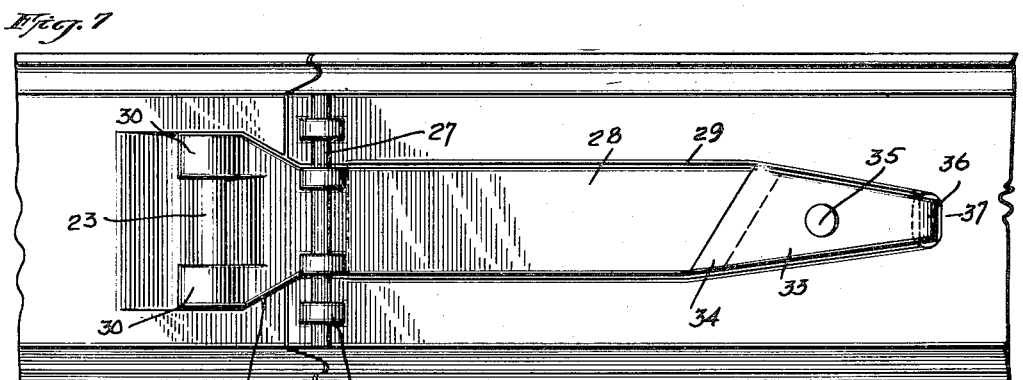
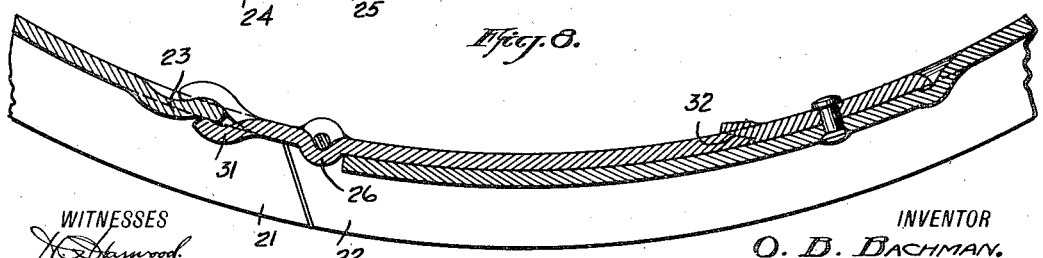
WITNESSES
INVENTOR
O. B. BACHMAN.
BY
ATTORNEYS Patented Nov. 11, 1924.

1,515,538

UNITED STATES PATENT OFFICE.

OTTO BRAYTON BACHMAN, OF NEW YORK, N. Y., ASSIGNOR TO NATIONAL AUTOPARTS CORPORATION, OF DOVER, DELAWARE, A CORPORATION OF DELAWARE.

DEMOUNTABLE RIM.

Application filed June 28, 1921. Serial No. 480,975.

*To all whom it may concern:*

Be it known that I, OTTO B. BACHMAN, a citizen of the United States, and a resident of the city of New York, borough of Manhattan, in the county and State of New York, have invented a new and Improved Demountable Rim, of which the following is a full, clear, and exact description.

This invention relates to a demountable rim for automobile wheels, and has for an object the provision of a compact, efficient, strong and easily operable rim construction which can be very quickly applied to and removed from the tire of an automobile wheel.

Another object resides in the provision of a structure which in its operation, either in assembling or disassembling, requires a minimum expenditure of time and labor and which can be operated without the need of an intimate knowledge of the application and removal of tires from rims and wheels.

A further object resides in the particular construction and arrangement of parts which are hereinafter described and claimed and shown in the accompanying drawings.

In general the invention comprises a sectional rim which can be collapsed very readily to remove it from a tire and which is placed loosely or approximately in place within a tire and then clamped very tightly in position by the movement of a single lever which can be operated either by the hand or foot. To remove the rim from the tire, it is merely necessary to grip one end of the lever and pull the same upward. This upward movement results in the movement of one section of the rim free from another, whereby the entire rim collapses. This invention relates to particular improvements on, and has reference to, the so-called sectional or collapsible rim, wherein is embodied separate sections, so approximated and adapted in combination with a tool or lever, so adjusted that it serves, upon the application of properly directed pressures on said lever, to contract, collapse, or expand the rim within a pneumatic or solid tire, as desired at will, without the use of special tools, or manual effort, and when so expanded, and the tool or lever seated, it is so constructed that it may be positively locked, which permits of the filling of the tube with the required amount of air, and of carrying said tire and rim as a "spare" on the rear of the car, or otherwise, and thus eliminating, by this locking device, an objection of much importance, against the use of collapsible rims.

The invention is illustrated in the drawings, of which—

Figure 7 is a plan view of the modified form of rim construction.

Figure 8 is a sectional view of the construction shown in Figure 7.

Figure 9 is a side vew of the modified form of rim construction.

Figure 10 is a plan view of a modified form of hinge.

Figure 11 is a longitudinal section through the construction shown in Figure 11.

Figure 1:
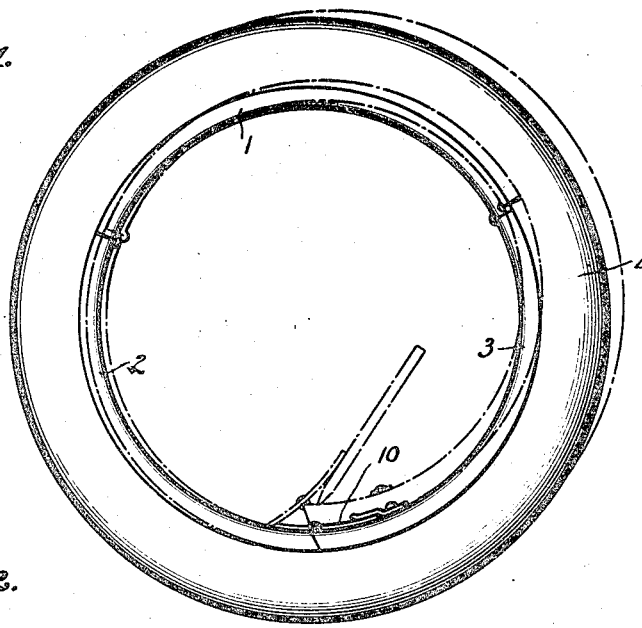
Figure 1 is a side view of a tire with the rim applied and showing in dotted lines the rim in the position it assumes during the process of the removal of the rim from the tire.
Figure 5:
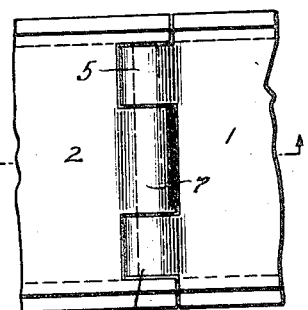
Figure 5 is a plan view of the operation of the rim showing one of the joints between the sections.
Figure 6:
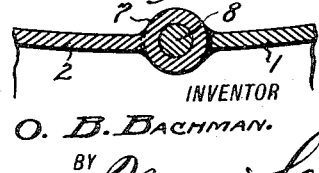
Figure 6 is a section through Figure 5.

This invention, of which the preferred form is shown in the drawings, comprises a demountable rim made in three sections, 1, 2 and 3 to which a tire 4 of any suitable preferred type is applied. The tire and the rim are then mounted in any suitable manner on the felly of a wheel. As shown in Fig. 1, the sections 1 and 2 and the sections 1 and 3 are pivotally connected. The nature of this pivot is shown in Figs. 5 and 6. As shown in these figures, section 1 is provided with apertured ear portions 5 and 6 spaced apart and projecting from the end of the section 1. These ear portions are adapted to be aligned with a similar ear 7 projecting from the section 2 and similarly apertured. When the sections 1 and 2 are disposed adjacent each other, these ear portions 5, 6 and 7 are in alignment to receive a pin 8 which holds them and the adjacent sections together. This joined arrangement is similar to the one in which doors are fastened to their hinges on the jambs and unlike other sectional rims, the said hinges are built into and of the rim material, instead of being common hinges attached by rivets or otherwise to the rim.

Figure 2:
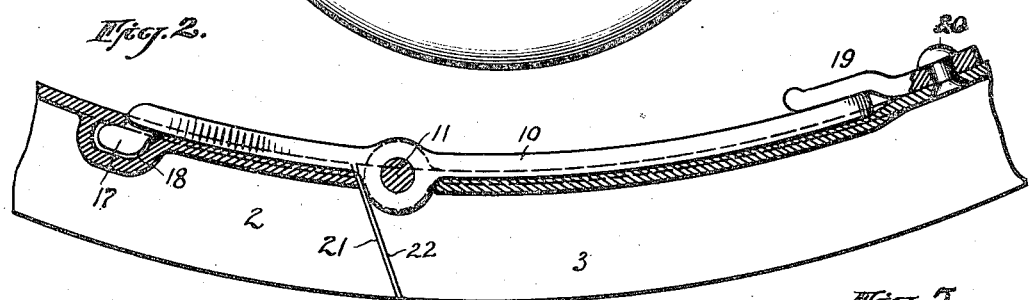
Figure 2 is a partial vertical longitudinal section taken through the rim, particularly that portion with which the operating handle is associated.
Figure 3:
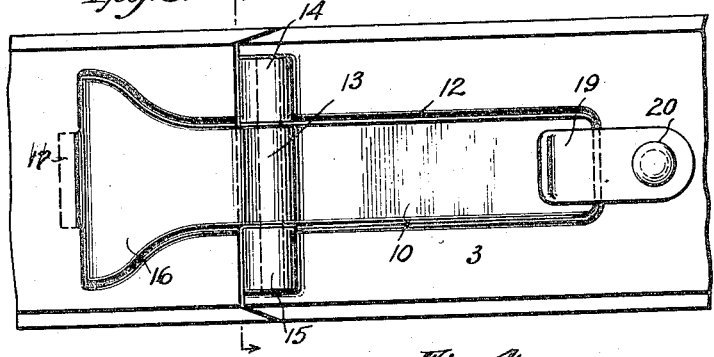
Figure 3 is a plan view of that portion of the rim shown in Figure 2.
Figure 4:
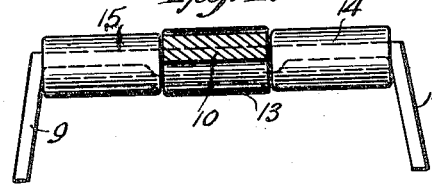
Figure 4 is a transverse section through Figure 3.

The rim in cross section is the usual channel-shaped rim with inclined lateral flanges 9 and 9′, as seen in Fig. 4, in which channel the tire 4 is received. The connection between sections 2 and 3 is shown principally in Figs. 2 and 3 and comprises a lever 10 fulcrumed on the pin 11 at the end of section 3 and extending normally partly over the adjacent end of the section 2. The surfaces of sections 2 and 3 over which the lever extends are slightly depressed, as shown in Fig. 2, to form a recess, designated by the numeral 12 in Fig. 3, to receive this lever so that it does not project too far above the level of the inner surface of the rim. This lever may be fulcrumed on the pin 11 by reason of the fact that it has an enlarged central lug portion 13 apertured to receive the pin 11 the ends of which are received in apertured lugs 14 and 15 disposed on the ends of section 3 at each side of the lug 13 of the lever 10. One end 16 of the lever 10 projects over the adjacent surface of section 2 and is considerably broader than the main body of the lever 10. This end 16 is provided with a downwardly projecting latch portion 17 which is adapted to engage in a recess or socket 18 suitably formed in any desired manner in the surface of the section 2 at the desired point. The other end of the lever 10 is adapted to be held in the recess 12 by engagement therewith of a pivoted detent lever 19 pivoted at 20 by any suitable means, such as a rivet.

The adjacent abutting faces of sections 1 and 2 and 1 and 3 meet in lines substantially radial of the rim, but as represented by the numerals 21 and 22 in Fig. 2, the abutting edges of sections 2 and 3 are inclined. In the operation of the device, assuming that the tires are in the position shown in Fig. 2, which is in the position in which the rim is fully extended against the tire 4, let us assume that we desire to remove the rim from the tire for one reason or another. In that case we would turn the lock or detent 19 on its pivot pin 20 thereby freeing the end of lever 10 which lever is constructed with a radius shorter than the radius of the rim and thereby raises itself when released by its contained spring action. This end of lever 10 would then be lifted by the hand. The spring action will raise the lever far enough to grasp it in the hand, it is moved upward in the direction shown by the position indicated in dotted lines in Fig. 1. This movement of the lever, it will be noticed, is taken around the socket 18 as a fulcrum point so that the pin 11 and the end of section 3 will move in a circle around the socket 18. This rim, as shown by the dotted line representation in Fig. 1, will cause the end of section 3 first to move upwardly away from and over the adjacent end of section 2 and then when this rotary movement of the pin 11 around the socket 18 as a center has continued far enough, will move the end of section 3 parallel to the end of section 2 to reduce the diameter of the rim, whereupon the engaged end of the lever is released the rim will be collapsed and in such condition that it can be very readily taken out of the tire.

After the tire has been repaired or a new one selected it is a very simple matter to replace the rim on the tire. To do this it is merely necessary to move the sections approximately into place and properly angularly related to the tire and the valve stems thereon, whereupon the latch or socket-engaging member 17 on the end of lever 10 is inserted in the socket or recess 18. The other end of lever 10 is then moved to the right and downwardly, gradually expanding the diameter of the rim, and during the latter part of this movement bends the end of section 3 down into proper operative relation with respect to the adjacent end of section 2. The detent 19 is then moved around its pivot 20 and restrains the end of the lever 10 in its normal position.

Another form of rim embodying the general principle of this invention is shown in Figures 7 to 11. In this improved form of rim adjacent ends of the rim, such as 21 and 22 are adapted to lie closely abutting each other. The end of section 21 is provided with a slightly turned up lip portion 23. This lip portion lies back from the front face of the section 21 and leading thereto a groove 24 is cut into the end face. On the end of the adjacent section 22 a plurality of struck up ear portions 25 and a plurality in integrally depressed portions 26 are adapted to form guideways adapted to receive a pin or shaft 27 on which a lever 28 is fulcrumed. This lever is adapted to lie in a shallow groove 29 on the inner face of the rim. The forward end of this lever projects beyond the end of the section 22 and is provided with a pair of narrow curved fingers such as 30 adapted to engage with the lip 23 on the upper surface thereof. Another finger 31 is adapted to engage the lip 23 on the lower surface thereof. This finger 31 is preferably broader than the two fingers 30. These fingers 30 and 31 are integrally formed from the metal of the lever. The lift 23 cooperating with the fingers 30 and 31 form a support for the lever as it is being raised, and, by reason of the inclined or sloping relation of the surfaces 21 and 22 of the rim section, will cause a perfect mechanical clearing action between the sections.

The rear end of the lever 28 is slightly beveled as shown at 32 and is adapted to be engaged by a lock 33, having a forward beveled portion 34. This lock is rotatably fulcrumed on a pin 35. The rear end 36 of this lock 33 is bent downwardly and is adapted to engage in a slight depression 37 when in its normal position, whereby the lock can be restrained in position. The natural resiliency of this lock will permit it to be moved out of normal position to release the end of the lever 28 when desired.

The operation of this improved form of rim is substantially the same in general principles as the operation of the rim previously described, the difference residing in the mechanical construction rather than in the principle of operation.

In Figures 10 and 11 is shown an improved form of hinge connection between adjacent sections. In this case one end of a section such as 52 is provided with a pair of struck up lip portions 53 beneath which a pair of integrally formed forwardly extending finger portions 54 are adapted to engage. When either of the above mentioned lever mechanisms are operated to release the rim, if the hinged portions are formed as shown in Figures 11 and 12, the adjacent sections will fall apart since this engagement is merely a latching or temporary engagement.

It will, therefore, be seen that I have provided a simple, compact, efficient and easily operable device whereby an automobile rim can be very easily and simply applied to and removed from a tire and the whole unit can be very quickly manipulated in the removal of tires from automobile wheels and the replacement of the same on the wheels.

What I claim is;

1. A demountable rim construction for automobile wheels, which comprises adjacent sections having abutting edges adapted to be separated, a lever fulcrumed on one of said sections and at the other end engaging the other of said sections, and a lip on said second section, spaced projecting fingers on said first section adapted to engage and embrace the lip on the second section whereby this engagement forms a fulcrum for the movement of the lever to cause the movement of one section with respect to the other section when the lever is operated.

2. A demountable rim construction for automobile wheels, which comprises a fulcrumed lever mounted on the end of one section of the rim, a plurality of integrally formed fingers stamped on the end of the lever, said fingers extending in opposite directions whereby they may engage a portion of another section of the rim therebetween when desired.

3. A demountable rim construction for automobile wheels, which comprises a fulcrumed lever mounted on the end of one section of the rim, a plurality of integrally formed fingers stamped on the end of the lever, said fingers extending in opposite directions whereby they may engage a portion of another section of the rim therebetween when desired, and a lip formed integrally on the end of another section to be engaged and embraced by said finger whereby the engagement will form a fulcrum point around which the lever may be moved when desired.

4. A demountable rim construction for automobile wheels, which includes a pair of abutting ends of the rim section, a lip on one of said sections, and a fulcrumed lever on the other of said sections having integrally stamped fingers thereon, certain of said fingers extending in one direction from the end of the lever and certain others of said fingers extending in another direction, said fingers adapted to engage with the said lip on opposite sides thereof whereby the engagement will act as a fulcrum point or line around which the lever may be moved to separate one section from another.

5. A hinge for demountable rims for automobile wheels, which comprises a lip portion struck from the middle of the section and offset somewhat therefrom, and a finger portion on the adjacent section adapted to extend beneath said lip and detachably interlocked therewith so that while this engagement holds the two sections will be held firmly together.

6. A hinge connection for the detachable sections of a demountable rim for automobile wheels, which includes a pair of struck-up lip portions formed integrally from the middle of the rim and offset slightly therefrom, and a pair of integrally formed finger portions on the end of the adjacent section adapted to extend beneath said lip portion and interlock therewith to detachably engage the sections together.

7. A demountable rim construction for automobile wheels, which includes adjacent abutting rim sections in one of which a slope or curve is formed, a lip integrally formed on the end of said section in said slope, the adjacent section having a depression therein, a lever mounted on the end of said second section having rotary movement, a portion of said lever adapted to lie in said depression, the other portion of said lever extending beyond the second section and when the lever is in its locked position extending into said slope or curve, and a plurality of oppositely disposed fingers integrally formed on the end of said lever and engaging on opposite sides of the lip on the first section, said engagement acting as a fulcrum point along which the lever may be moved by grasping the other end in order to separate one section from the other.

8. A demountable rim construction for automobile wheels, which includes adjacent abutting rim sections in one of which a slope or curve is formed, a lip integrally formed on the end of said section in said slope, the adjacent section having a depression therein, a lever mounted on the end of said second section having rotary movement, a portion of said lever adapted to lie in said depression, the other portion of said lever extending beyond the second section and when the lever is in its locked position extending into said slope or curve, a plurality of oppositely disposed fingers integrally formed on the end of said lever and engaging on opposite sides of the lip on the first section, said engagement acting as a fulcrum point along which the lever may be moved by grasping the other end in order to separate one section from the other, and a movable locking member in said depression adapted to be moved to engage the end of the lever when lying in said depression to hold it therein.

OTTO BRAYTON BACHMAN.